United States Patent Office 2,934,505
Patented Apr. 26, 1960

2,934,505

PROCESS FOR POLYMERIZATION OF ALKYLENE OXIDES WITH METAL SALTS

Arthur E. Gurgiolo, Lake Jackson, Tex., assignor to The Dow Chemical Company, Midland, Mich., a corporation of Delaware No Drawing. Application July 22, 1958
Serial No. 750,079

13 Claims. (Cl. 260—2)

This invention relates to a process for the polymerization of a lower alkylene oxide to a polymeric material under the catalytic influence of certain organic acid salts.

More particularly, the process pertains to polymerization of olefin oxides, particularly ethylene oxide and propylene oxide, by employing salts of fatty acids and aliphatic di- and tricarboxylic acids having from 1 to 30 carbon atoms and aromatic mono- and dicarboxylic acids having up to 3 aromatic rings of group II metals having an atomic number in the range of 12 to 57 and trivalent metals of ferric iron and aluminum. The group II metals are magnesium, calcium, zinc, strontium, cadmium, and barium. Of the above metals, salts of calcium, barium, and strontium are particularly effective as catalysts.

Illustrative examples of the organic acids which form the metal salt effective in catalyzing the polymerization of lower alkylene oxides are formic, acetic, propionic, butyric, valeric, caproic, caprylic, capric, lauric, myristic, palmitic, stearic, behenic, cerotic and naphthenic of the saturated fatty acids; acrylic, methacrylic, crotonic and sorbic of the unsaturated fatty acids; oxalic, malonic, succinic, pimelic, sebacic, maleic, citric, and tricarballylic of the aliphatic di- and tricarboxylic acids; and benzoic, naphthoic, authroic, phthalic, and naphthalic of the aromatic mono- and dicarboxylic acids.

The amount of catalyst that is employed is ordinarily between from 0.1 to 6 percent by weight, based on the weight of the alkylene oxide monomer being polymerized. Preferably an amount of the catalyst in the neighborhood of 0.5 to 2 percent by weight is utilized. The employment of the preferred amount of catalyst for accomplishing the polymerization ordinarily secures optimum rates of reaction or complete conversion of the monomer to a high molecular weight polymer.

Solid ethylene oxide polymers may be obtained by practice of the invention which are white crystalline solids and have at least one and usually more of a variety of uses including the preparation of moldings, films, fibers and in coating applications. They generally provide high tensile strength fabricated articles that are possessed of good dielectric characteristics. They may also be used as thickeners, sizing agents, and binders. The solid polymers are soluble in water, acetonitrile, chloroform, formaldehyde, and methanol and insoluble in methyl ethyl ketone, ethyl acetate, and carbon tetrachloride. The reduced viscosities of these polymers, measured in acetonitrile at a concentration of 0.2 gram per 100 ml. of solvent at a temperature of 30° C., are above 0.1.

The reduced viscosity which is an indication of the molecular weight of a polymer is obtained by dividing the specific viscosity of a solution of the polymer in a solvent by the concentration of the polymer in the solution measured in grams of the polymer per 100 ml. of solvent. The specific viscosity is obtained by dividing the difference in the viscosity of the solution and viscosity of the pure solvent by the viscosity of the solvent.

The propylene oxide polymers obtained by the process are high molecular weight liquid or waxy polymers which may be used in coating application, as thickeners, sizing agents, binders, and as components in polyurethene foam, or as a reactive constituent in other plastic materials.

In the polymerization of the alkylene oxide, the monomer and the catalyst may be simply mixed together and charged into a closed vessel and heated until the polymerization is complete. It is usually beneficial for the reaction mass to be agitated during the polymerization. Temperatures in the range of about 30° to 150° C. may be used. At the lower temperatures, higher yield of the high molecular weight or solid polymer may be realized, but the polymerization time is generally longer and may extend to 200 hours or more. At the high temperatures, the rate of reaction is relatively rapid and a suitable point for the termination of the reaction may be reached in less than 3 hours. However, at these high temperatures, the yield of the solid resin obtained may decrease. In order to obtain a fairly rapid rate of reaction with a suitable yield of the desired solid polymer, the polymerization is ordinarily carried out at a temperature between 80° and 130° C., the optimum temperature being about 100° C. At the temperatures of 80° to 130° C., the polymerization usually is substantially completed in about 18 to 120 hours, the optimum being from 24 to 60 hours.

The polymerization rate may be increased by carrying out the reaction in the presence of a trace amount of water. With a trace of water, the polymerization of the alkylene oxide may be effected in ½ to 3 hours, which without the water may require 24 hours or more. Since the presence of water in relatively large amounts has a tendency to lower the molecular weight of the polymer obtained, only a trace amount of water is used. Generally the amount of water employed is not greater than 0.2 weight percent of the catalyst with 0.1 to 0.125 weight percent of the catalyst being preferred.

The polymerization may also be carried out in a suitable inert non-aqueous diluent medium. The employment of such a medium for the polymerization may sometimes tend to reduce the rate of the reaction, although, in certain instances, it may facilitate the achievement of a more nearly complete copolymerization of the monomer. The medium either may be a solvent or a non-solvent suspending medium. It is advantageous for the diluent medium that is employed to boil at about the desired polymerization temperature. In this way, the utilization of reflux techniques permits an easy means for the regulation of the reaction temperature. Diethyl ether, diisopropyl ether, petroleum ether, benzene, n-hexane and the like provide beneficial solvent characteristics for employment in the polymerization. While various low boiling, liquid, non-solvent media may also be employed, it is usually more desirable to utilize solvents. The inert non-aqueous diluent medium may generally be used in a quantity that is approximately equal to the quantity of the monomers being so polymerized.

The polymeric product may be recovered and purified from the reaction mass according to several procedures apparent to those skilled in the art. For example, the unreacted monomer and the solvent or other diluent medium (when one has been employed) may be stripped from the reaction mass by vaporization to leave the polymeric material. The crude polymer may be a thick viscous liquid or may be in the form of a tough, rubberlike to a wax-like solid associated with liquid polymers that may have been formed during the reaction. The solid polymer may be separated from the reaction product by dissolving the product in a suitable solvent, such as hot acetone or acetonitrile, and the solid polymer precipitated or crystallized from the solution by cooling the solution at a low temperature, generally about −20°

C. or below. Recrystallization may be employed for further purification until a suitable solid polymeric material is obtained. The liquid polymers are then obtained by evaporation of the solvent.

By the process of the invention, polymers of other olefin oxides besides ethylene oxide and propylene oxide may also be prepared. Solid polymers of such lower olefin oxides as chloropropylene oxide, which is also known as epichlorohydrin, isobutylene oxide and others that contain not more than four carbon atoms in their molecules may also be obtained.

The following examples further illustrate the invention.

*Example I*

A series of runs was made where ethylene oxide and propylene oxide were polymerized with different catalysts.

In each run a glass vial, 1 inch in diameter and 5 inches long, was used as the reactor. The vial was purged with nitrogen and then a given amount of catalyst and 15 grams of the monomer were added. The vial and its contents were chilled in a Dry Ice-acetone bath, sealed, and allowed to come to room temperature.

After the vial had come to room temperature, it was placed in a rotating steam heated autoclave which was maintained at 130° C. where the monomer in the vial was allowed to polymerize for a predetermined time. After the polymerization, the vial was removed from the autoclave, opened, and the unpolymerized monomer vaporized. The polymer obtained was weighed.

Solid polymers of ethylene oxide were obtained, while the propylene oxide polymers were thick viscous slightly cloudy syrups or waxes. The ethylene oxide polymers were white in color and were molded into water soluble films which could be oriented by stretching. The reduced viscosities of some of the solid polymers were determined on the basis of acetonitrile solutions containing 0.2 gram of polymer per 100 ml. of acetonitrile at 30° C.

The results obtained and other pertinent data are shown in the table below.

diluted to 25 ml. with hexane. The resulting solution contained 1 weight percent calcium and 0.2 weight percent water. One milliliter of the resulting solution obtained above was used as catalyst for the polymerization of 15 grams of ethylene oxide. The polymerization was carried out at 130° C. in a manner similar to that described in Example I.

In a polymerization time of 90 minutes, 14.5 grams of a hard white brittle wax was obtained. The product had a reduced viscosity, at 0.2 weight percent concentration in acetonitrile at 30° C. of 0.345 which indicated a molecular weight of 30,000.

In the second run, a 5 grams sample of calcium naphthenate containing 4 weight percent calcium and 0.5 weight percent water was diluted to give a solution containing 1 weight percent calcium and 0.125 weight percent water. One milliliter of the resulting solution was used as catalyst for the polymerization of 15 grams of ethylene oxide in a manner described above. In a polymerization time of 45 minutes, 13.8 grams of a hard, tough, white fibrous polymer was obtained. The reduced viscosity of the product under the condition described above was 1.125 which indicated a molecular weight of 100,000.

What is claimed is:

1. A process for the polymerization of a lower alkylene oxide containing not more than 4 carbon atoms in its molecule to a polymeric material, which comprises mixing the alkylene oxide with from 0.1 to 6 weight percent of a catalyst selected from the group consisting of salts of unsubstituted fatty acids having from 1 to 30 carbon atoms and unsubstituted aliphatic di- and tricarboxylic acids having up to 30 carbon atoms and unsubstituted aromatic mono- and dicarboxylic acids having up to 3 aromatic rings of Group II metals having an atomic number in the range of 12 to 57, heating the resulting mixture to a temperature of from 30° to 150° C. for a period of time sufficient to polymerize the olefin oxide, and separating the polymeric material from the reaction mass.

| Catalyst | Amount of Catalyst Weight, Percent | Monomer | Reaction Time, Hours | Weight of Polymer, Grams | Percent Conversion of Monomer | Reduced Viscosity of Polymer |
|---|---|---|---|---|---|---|
| Calcium Acetate·H₂O | 0.5 | ethylene oxide | 24 | 15 | 100 | |
| Calcium Oxalate·H₂O | 0.5 | do | 72 | 6 | 40 | 1.25 |
| Calcium Stearate | 0.15 | do | 24 | 14.2 | 95 | |
| Calcium Formate | 0.15 | do | 136 | 11.1 | 74 | 1.45 |
| Calcium Acrylate | 0.5 | do | 24 | 15 | 100 | 0.25 |
| Barium Citrate | 1.0 | do | 24 | 14.2 | 94.7 | 1.43 |
| Barium Stearate | 0.1 | do | 24 | 14.3 | 95.4 | 0.15 |
| Do | 0.2 | do | 24 | 15 | 100 | 0.35 |
| Do | 0.4 | do | 24 | 15 | 100 | 0.21 |
| Aluminum Formate | 1.0 | do | 24 | 12.8 | 85.4 | 0.2 |
| Aluminum Stearate | 1.0 | do | 58 | 2 | 13.3 | |
| Aluminum Basic Acetate | 1.0 | do | 24 | 3.2 | 21 | 1.28 |
| Aluminum Formate | 1.0 | do | 72 | 14 | 93 | 1.21 |
| Zinc Stearate | 1.0 | do | 48 | 8.8 | 54 | 1.38 |
| Cadmium Stearate | 1.0 | do | 72 | 13.5 | 90 | 0.10 |
| Magnesium Oxalate | 1.0 | do | 118 | | | |
| Calcium Acetate | 0.5 | propylene oxide | 35 | 9.4 | 62.6 | |
| Do | 1.0 | do | 35 | 12.1 | 80.8 | |
| Do | 2.0 | do | 35 | 14.1 | 94.0 | |
| Calcium Stearate | 1.0 | do | 35 | 12.9 | 86.0 | |
| Do | 0.5 | do | 24 | | | |
| Do | 2.0 | do | 24 | | | |
| Calcium Acrylate | 2.0 | do | 24 | 12 | 80 | |
| Barium Stearate | 0.1 | do | 24 | | | |
| Do | 0.2 | do | 48 | 14.2 | 94.6 | |
| Do | 0.5 | do | 48 | 14.8 | 98.7 | |

*Example II*

To illustrate the effect of a trace amount of water in the polymerization reaction, two runs were made where ethylene oxide was polymerized using calcium naphthenate as catalyst with the catalyst containing a different amount of water in each of the runs.

In the first run, a 5 grams sample of a solution of calcium naphthenate in mineral spirits containing 5 weight percent calcium and 1 weight percent water was 2. A process according to claim 1 wherein the olefin oxide is propylene oxide.

3. A process according to claim 1 wherein the olefin oxide is ethylene oxide.

4. A process for the polymerization of propylene oxide to a polymeric material, which comprises mixing the propylene oxide with from 0.1 to 6 weight percent of barium stearate as catalyst, heating the resulting mixture to a temperature of from 30° to 150° C. for a period of time sufficient to polymerize the propylene oxide, and separating the polymeric material from the reaction mass.

5. A process for the polymerization of propylene oxide to a polymeric material, which comprises mixing the propylene oxide with from 0.5 to 2 weight percent of barium stearate, heating the resulting mixture to a temperature of from 80° C. to 130° C. for a time of from 18 to 120 hours, and separating the polymeric material from the reaction mass.

6. A process for the polymerization of propylene oxide to a polymeric material, which comprises mixing the propylene oxide with from 0.1 to 6 weight percent of calcium stearate, heating the resulting mixture to a temperature of from 30° to 150° C. for a period of time sufficient to polymerize the propylene oxide, and separating the polymeric material from the reaction mass.

7. A process for the polymerization of propylene oxide to a polymeric material, which comprises mixing the propylene oxide with 0.5 to 2 weight percent of calcium stearate, heating the resulting mixture to a temperature of from 80° C. to 130° C. for a time of from 18 to 120 hours, and separating the polymeric material from the reaction mass.

8. A process for the polymerization of ethylene oxide to a solid polymeric material, which comprises mixing the ethylene oxide with from 0.1 to 6 weight percent of barium stearate as catalyst, heating the resulting mixture to a temperature of from 30° to 150° C. for a period of time sufficient to polymerize the ethylene oxide, and separating the solid polymeric material from the reaction mass.

9. A process for the polymerization of ethylene oxide to a solid polymeric material, which comprises mixing the ethylene oxide with 0.5 to 2 weight percent of barium stearate, heating the resulting mixture to a temperature of from 80° C. to 130° C. for a time of from 18 to 120 hours, and separating the solid polymeric material from the reaction mass.

10. A process for the polymerization of ethylene oxide to a solid polymeric material, which comprises mixing the alkylene oxide with from 0.1 to 6 weight percent of calcium stearate as catalyst, heating the resulting mixture to a temperature of from 30° to 150° C. for a period of time sufficient to polymerize the ethylene oxide, and separating the solid polymeric material from the reaction mass.

11. A process for the polymerization of ethylene oxide to a solid polymeric material, which comprises mixing the ethylene oxide with 0.5 to 2 weight percent of calcium stearate, heating the resulting mixture to a temperature of from 80° C. to 130° C. for a time of from 18 to 120 hours, and separating the solid polymeric material from the reaction mass.

12. A process for the polymerization of ethylene oxide to a solid polymeric material, which comprises mixing the ethylene oxide with from 0.1 to 6 weight percent of calcium naphthenate containing not more than 0.2 weight percent of water, heating the resulting mixture to a temperature in the range of 30° C. to 150° C. for from ½ to 3 hours, and separating the solid polymeric material from the reaction mass.

13. A process according to claim 12, wherein the ethylene oxide is mixed with from 0.5 to 2 weight percent of calcium naphthenate containing from 0.1 to 0.125 weight percent water, and the mixture is heated to a temperature in the range of 80° to 130° C.

No references cited.